(12) United States Patent
Kim

(10) Patent No.: US 10,941,275 B2
(45) Date of Patent: *Mar. 9, 2021

(54) COMPACT CAMERA MODULE

(71) Applicant: Ticona LLC, Florence, KY (US)

(72) Inventor: Young Shin Kim, Erlanger, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,315

(22) Filed: Apr. 30, 2019

(65) Prior Publication Data

US 2019/0264001 A1  Aug. 29, 2019

Related U.S. Application Data

(63) Continuation of application No. 14/052,800, filed on Oct. 14, 2013, now Pat. No. 10,280,282.

(Continued)

(51) Int. Cl.
*C08K 3/34* (2006.01)
*B29C 48/285* (2019.01)
(Continued)

(52) U.S. Cl.
CPC ............ *C08K 3/34* (2013.01); *B29C 48/2886* (2019.02); *B29C 48/345* (2019.02); *B29C 48/40* (2019.02);
(Continued)

(58) Field of Classification Search
CPC ............... C09K 19/38; C09K 19/3809; C09K 2019/521; C08K 3/013; C08K 3/32; C08K 7/14; C08K 3/0033; C08K 2003/3045; C08K 2003/325; C08K 2201/003; C08K 7/10; C08L 67/03; C08L 77/12; B29C 2947/92704; B29C 47/1045; B29C 47/30; B29C 47/6087; B29C 47/64;
(Continued)

(56) References Cited

U.S. PATENT DOCUMENTS 4,458,039 A * 7/1984 Eickman .................. C08K 3/34
523/216
5,352,746 A 10/1994 Asai et al.
(Continued)

FOREIGN PATENT DOCUMENTS

EP  0 312 331 A2  4/1989
EP  0 312 331 A3  4/1989
(Continued)

OTHER PUBLICATIONS

Search Report from State Intellectual Property Office of the People's Republic of China, dated Dec. 30, 2016, 2 pages.
(Continued)

*Primary Examiner* — Yan Lan
(74) *Attorney, Agent, or Firm* — Dority & Manning, P.A.

(57) ABSTRACT

A compact camera module that contains a generally planar base on which is mounted a lens barrel is provided. The base, barrel, or both are molded from a polymer composition that includes a thermotropic liquid crystalline polymer and a plurality of mineral fibers (also known as "whisker"). The mineral fibers have a median width of from about 1 to about 35 micrometers and constitute from about 5 wt. % to about 60 wt. % of the polymer composition.

18 Claims, 2 Drawing Sheets

Related U.S. Application Data

(60) Provisional application No. 61/779,260, filed on Mar. 13, 2013.

(51) Int. Cl.

| | | |
|---|---|---|
| *C08K 5/092* | (2006.01) | |
| *C08K 5/13* | (2006.01) | |
| *H01B 1/20* | (2006.01) | |
| *H01B 1/24* | (2006.01) | |
| *B29C 48/88* | (2019.01) | |
| *B29C 48/625* | (2019.01) | |
| *B29C 48/05* | (2019.01) | |
| *C08J 5/10* | (2006.01) | |
| *C08K 3/40* | (2006.01) | |
| *C08K 7/02* | (2006.01) | |
| *C09K 19/54* | (2006.01) | |
| *C09K 19/52* | (2006.01) | |
| *B29C 48/67* | (2019.01) | |
| *B29C 48/92* | (2019.01) | |
| *B29C 48/345* | (2019.01) | |
| *B29C 48/76* | (2019.01) | |
| *C09K 19/38* | (2006.01) | |
| *B29C 48/40* | (2019.01) | |
| *B29C 48/04* | (2019.01) | |

(52) U.S. Cl.
CPC .......... *B29C 48/625* (2019.02); *B29C 48/67* (2019.02); *B29C 48/767* (2019.02); *B29C 48/919* (2019.02); *B29C 48/92* (2019.02); *C08J 5/10* (2013.01); *C08K 3/346* (2013.01); *C08K 3/40* (2013.01); *C08K 5/092* (2013.01); *C08K 5/13* (2013.01); *C08K 7/02* (2013.01); *C09K 19/3809* (2013.01); *C09K 19/52* (2013.01); *C09K 19/54* (2013.01); *H01B 1/20* (2013.01); *H01B 1/24* (2013.01); *B29C 48/04* (2019.02); *B29C 48/05* (2019.02); *B29C 2948/92704* (2019.02); *C09K 2019/521* (2013.01); *Y10T 428/1372* (2015.01); *Y10T 428/266* (2015.01); *Y10T 428/269* (2015.01)

(58) Field of Classification Search
CPC ... B29C 47/767; B29C 47/8895; B29C 47/92; H01B 1/20; H01B 1/24; Y10T 428/1372; Y10T 428/266; Y10T 428/269
See application file for complete search history.

(56) References Cited

U.S. PATENT DOCUMENTS

| | | |
|---|---|---|
| 5,492,946 A | 2/1996 | Huspeni et al. |
| 5,508,374 A | 4/1996 | Lee et al. |
| 5,538,666 A | 7/1996 | Jin |
| 5,830,940 A | 11/1998 | Nakamura et al. |
| 5,847,039 A | 12/1998 | Nagashima et al. |
| 5,928,589 A | 7/1999 | Norota et al. |
| 5,962,122 A | 10/1999 | Walpita et al. |
| 5,997,765 A | 12/1999 | Furuta et al. |
| 6,010,760 A | 1/2000 | Miyazaki et al. |
| 6,046,300 A | 4/2000 | Umetsu et al. |
| 6,063,848 A | 5/2000 | Murakami et al. |
| 6,140,455 A | 10/2000 | Nagashima et al. |
| 6,153,121 A | 11/2000 | Makabe et al. |
| 6,379,795 B1 | 4/2002 | Bisaria et al. |
| 6,492,463 B1 | 12/2002 | Waggoner |
| 6,495,616 B2 | 12/2002 | Maeda |
| 6,613,847 B2 | 9/2003 | Soelch |
| 6,680,002 B2 | 1/2004 | Yamauchi et al. |
| 6,702,955 B1 | 3/2004 | Murakami et al. |
| 6,702,956 B2 | 3/2004 | Maeda et al. |
| 6,733,691 B2 | 5/2004 | Nagano et al. |
| 6,755,992 B2 | 6/2004 | Okamoto et al. |
| 6,758,989 B2 | 7/2004 | Miyashita et al. |
| 6,797,198 B1 | 9/2004 | Miyashita et al. |
| 6,833,405 B1 | 12/2004 | Cottis |
| 6,861,463 B2 | 3/2005 | Cottis |
| 7,079,405 B2 | 7/2006 | Tobita et al. |
| 7,166,238 B2 | 1/2007 | Kato et al. |
| 7,175,779 B1 | 2/2007 | Kricheldorf et al. |
| 7,189,778 B2 | 3/2007 | Tobita et al. |
| 7,276,284 B2 | 10/2007 | Frohs |
| 7,344,657 B2 | 3/2008 | Okamoto et al. |
| 7,438,832 B2 | 10/2008 | Majumdar et al. |
| 7,540,991 B2 | 6/2009 | Shimoyama et al. |
| 7,547,403 B2 | 6/2009 | Miyashita et al. |
| 7,601,771 B2 | 10/2009 | Schmidt et al. |
| 7,641,833 B2 | 1/2010 | Aoki et al. |
| 7,648,748 B2 | 1/2010 | Nakane et al. |
| 7,704,408 B2 | 4/2010 | Fukatsu |
| 7,740,770 B2 | 6/2010 | Mizumoto et al. |
| 7,789,670 B2 | 9/2010 | Fukatsu et al. |
| 7,824,572 B2 | 11/2010 | Okamoto |
| 7,825,176 B2 | 11/2010 | Kim et al. |
| 7,892,450 B2 | 2/2011 | Uchida et al. |
| 7,931,824 B2 | 4/2011 | Gin et al. |
| 7,980,897 B2 | 7/2011 | Fukatsu et al. |
| 7,985,351 B2 | 7/2011 | Yamauchi et al. |
| 8,029,694 B2 | 10/2011 | Saga |
| 8,066,907 B2 | 11/2011 | Kohinata et al. |
| 8,142,683 B2 | 3/2012 | Murouchi et al. |
| 8,192,645 B2 | 6/2012 | Murouchi et al. |
| 8,202,448 B2 | 6/2012 | Fukuhara et al. |
| 8,231,805 B2 | 7/2012 | Fukuhara et al. |
| 8,272,879 B2 | 9/2012 | Fukatsu et al. |
| 8,324,307 B2 | 12/2012 | Harder et al. |
| 8,337,719 B2 | 12/2012 | Hosoda et al. |
| 8,432,484 B2 | 4/2013 | Christison |
| 8,440,780 B2 | 5/2013 | Hamaguchi et al. |
| 8,465,670 B2 | 6/2013 | Kondo et al. |
| 8,545,719 B2 | 10/2013 | Komatsu et al. |
| 8,646,994 B2 | 2/2014 | Kim et al. |
| 8,658,057 B2 | 2/2014 | Nakayama et al. |
| 8,696,932 B2 | 4/2014 | Uchida et al. |
| 8,697,817 B2 | 4/2014 | Waggoner et al. |
| 9,018,315 B2 | 4/2015 | Waggoner et al. |
| 9,355,753 B2 | 5/2016 | Kim |
| 9,512,293 B2 | 12/2016 | Kim |
| 9,822,254 B2 | 11/2017 | Kim |
| 2002/0064701 A1 | 5/2002 | Hand et al. |
| 2002/0190432 A1* | 12/2002 | Shiwaku ............... C08L 67/00 264/328.1 |
| 2005/0077498 A1 | 4/2005 | Kato et al. |
| 2005/0176835 A1 | 8/2005 | Kobayashi et al. |
| 2005/0191877 A1 | 9/2005 | Huang |
| 2005/0260361 A1 | 11/2005 | Alms et al. |
| 2006/0009580 A1 | 1/2006 | Alms et al. |
| 2006/0014876 A1 | 1/2006 | Bushelman et al. |
| 2006/0025561 A1 | 2/2006 | Watanabe et al. |
| 2007/0057236 A1 | 3/2007 | Hosoda et al. |
| 2007/0190346 A1 | 8/2007 | Ikegawa |
| 2009/0027586 A1 | 1/2009 | Kumai et al. |
| 2009/0212684 A1 | 8/2009 | Saito et al. |
| 2010/0012354 A1 | 1/2010 | Hedin et al. |
| 2011/0171452 A1 | 7/2011 | Öttinger et al. |
| 2011/0189454 A1 | 8/2011 | Fukuhara et al. |
| 2012/0135228 A1 | 5/2012 | Fukuhara et al. |
| 2012/0193571 A1 | 8/2012 | Lee et al. |
| 2012/0199790 A1 | 8/2012 | Yun et al. |
| 2013/0015400 A1 | 1/2013 | Matsubara et al. |
| 2013/0015401 A1 | 1/2013 | Matsubara et al. |
| 2013/0015411 A1 | 1/2013 | Kang et al. |
| 2013/0022828 A1 | 1/2013 | Matsubara et al. |
| 2013/0048909 A1 | 2/2013 | Nair et al. |
| 2013/0048914 A1 | 2/2013 | Nair et al. |
| 2013/0052447 A1 | 2/2013 | Grenci et al. |
| 2013/0062558 A1 | 3/2013 | Nair et al. |
| 2013/0122272 A1 | 5/2013 | Kim |
| 2013/0122273 A1 | 5/2013 | Kim |
| 2013/0122274 A1 | 5/2013 | Kim et al. |
| 2013/0123420 A1 | 5/2013 | Kim |

(56) References Cited

U.S. PATENT DOCUMENTS

| | | |
|---|---|---|
| 2013/0200297 A1 | 8/2013 | Saga |
| 2013/0231434 A1 | 9/2013 | Lee et al. |
| 2013/0231436 A1 | 9/2013 | Lee et al. |
| 2013/0253118 A1 | 9/2013 | Shiraishi et al. |
| 2014/0105590 A1 | 4/2014 | Kim |
| 2014/0264183 A1 | 9/2014 | Kim |

FOREIGN PATENT DOCUMENTS

| | | |
|---|---|---|
| EP | 1 116 769 A2 | 7/2001 |
| EP | 1 116 769 A3 | 7/2001 |
| EP | 1 382 437 A2 | 1/2004 |
| EP | 1 382 437 A3 | 1/2004 |
| EP | 1 699 228 A1 | 9/2006 |
| JP | H 0481451 A | 3/1992 |
| JP | H 05140282 A | 6/1993 |
| JP | H 0718162 A | 1/1995 |
| JP | H 09143347 A | 6/1997 |
| JP | H 09297256 A | 11/1997 |
| JP | H 1160927 A | 3/1999 |
| JP | H 1180517 A | 3/1999 |
| JP | H 1180518 A | 3/1999 |
| JP | H 11147999 A | 6/1999 |
| JP | 2000080289 A | 3/2000 |
| JP | 2000273292 A | 10/2000 |
| JP | 2000273320 A | 10/2000 |
| JP | 2000281885 A | 10/2000 |
| JP | 2004182895 A | 7/2004 |
| JP | 2004263162 A | 9/2004 |
| JP | 2005187696 A | 7/2005 |
| JP | 2008075079 A | 4/2008 |
| JP | 200814573 A | 9/2008 |
| JP | 2009155436 A | 7/2009 |
| JP | 2009242454 A | 10/2009 |
| JP | 2009242455 A | 10/2009 |
| JP | 5172279 B2 | 3/2013 |
| KR | 20120114048 A | 10/2012 |
| KR | 20130047456 A | 5/2013 |
| WO | WO 2005/063889 A1 | 7/2005 |
| WO | WO 2006/104701 A1 | 10/2006 |
| WO | WO 2006/126861 A1 | 11/2006 |
| WO | WO 2009/005317 A2 | 1/2009 |
| WO | WO 2009/005317 A3 | 1/2009 |
| WO | WO 2010/013578 A1 | 2/2010 |
| WO | WO 2012/050082 A1 | 4/2012 |
| WO | WO 2013/032970 A1 | 3/2013 |
| WO | WO 2013/066003 A | 5/2013 |
| WO | WO 2013/074469 A1 | 5/2013 |
| WO | WO 2013/074475 A1 | 5/2013 |
| WO | WO 2013/129338 A1 | 9/2013 |

OTHER PUBLICATIONS

Article—Liu et al., "Immobilization and melting point depression of imidazolium ionic liquids on the surface of nano-$SiO_x$ particles," *Dalton Trans.*, vol. 39; 2010, pp. 3190-3194.

Product Information—Sigrafil® C, The Carbon Fiber for Thermoplastic Compounds from SGL Group, 2009, 4 pages.

Production Information on Talc from Nippon Talc Co., Ltd., 5 pages.

Search Report and Written Opinion for PCT/US2013/064757, dated Jan. 17, 2014, 11 pages.

\* cited by examiner

COMPACT CAMERA MODULE

CROSS-REFERENCE TO RELATED APPLICATIONS

The present application is a continuation of U.S. application Ser. No. 14/052,800, filed on Oct. 14, 2013, which claims priority to U.S. Provisional Application Ser. No. 61/779,260, filed on Mar. 13, 2013, which are incorporated herein in their entirety by reference thereto.

BACKGROUND OF THE INVENTION

Compact camera modules ("CCM") are often employed in mobile phones, laptop computers, digital cameras, digital video cameras, etc. that contain a plastic lens barrel disposed on a base. Because conventional plastic lenses could not withstand solder reflow, camera modules were not typically surface mounted. Recently, however, attempts have been made to use liquid crystalline polymers having a high heat resistance for the molded parts of a compact camera module, such as the lens barrel or the base on which it is mounted. To improve the mechanical properties of such polymers, it is known to add a plate-like substance (e.g., talc) and milled glass. Although strength and elastic modulus can be improved in this manner, problems are still encountered when attempting to use such materials in compact camera modules due to their small dimensional tolerance. For example, the mechanical properties are often poor or not uniform, which leads to poor filing and a lack of dimensional stability in the molded part. Further, an increase in the amount of milled glass to improve mechanical properties can result in a surface that is too rough, which can lead to errors in the camera performance and sometimes cause unwanted particle generation.

As such, a need exists for a polymer composition that can be readily employed in the molded parts of compact camera modules, and yet still achieve good mechanical properties.

SUMMARY OF THE INVENTION

In accordance with one embodiment of the present invention, a compact camera module is disclosed that comprises a generally planar base on which is mounted a lens barrel. The base, barrel, or both have a thickness of about 500 micrometers or less and are molded from a polymer composition that comprises a thermotropic liquid crystalline polymer and a plurality of mineral fibers. The mineral fibers have a median width of from about 1 to about 35 micrometers and constitute from about 5 wt. % to about 60 wt. % of the polymer composition.

Other features and aspects of the present invention are set forth in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying figures, in which.

DETAILED DESCRIPTION

Figure 1:
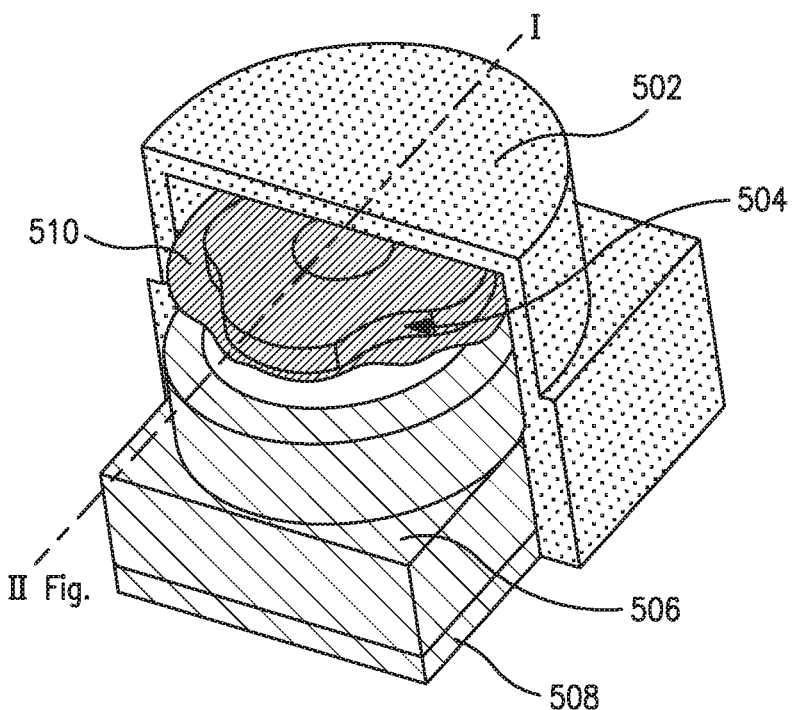
FIGS. 1-2 are perspective and front views of a compact camera module ("CCM") that may be formed in accordance with one embodiment of the present invention.

It is to be understood by one of ordinary skill in the art that the present discussion is a description of exemplary embodiments only, and is not intended as limiting the broader aspects of the present invention.

Generally speaking, the present invention is directed to a compact camera module ("CCM"), such as those commonly employed in wireless communication devices (e.g., cellular telephone). The camera module contains a generally planar base on which is mounted a lens barrel. The base and/or barrel are formed form a polymer composition that contains a liquid crystalline polymer and a plurality of mineral fibers (also known as "whiskers"). Examples of such mineral fibers include those that are derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are inosilicates, such as wollastonite fibers available from Nyco Minerals under the trade designation NYGLOS® (e.g., NYGLOS® 4W or NYGLOS® 8).

The mineral fibers may have a median width (e.g., diameter) of from about 1 to about 35 micrometers, in some embodiments from about 2 to about 20 micrometers, in some embodiments from about 3 to about 15 micrometers, and in some embodiments, from about 7 to about 12 micrometers. The mineral fibers may also have a narrow size distribution. That is, at least about 60% by volume of the fibers, in some embodiments at least about 70% by volume of the fibers, and in some embodiments, at least about 80% by volume of the fibers may have a size within the ranges noted above. Without intending to be limited by theory, it is believed that mineral fibers having the size characteristics noted above can more readily move through molding equipment, which enhances the distribution within the polymer matrix and minimizes the creation of surface defects. In addition to possessing the size characteristics noted above, the mineral fibers may also have a relatively high aspect ratio (average length divided by median width) to help further improve the mechanical properties and surface quality of the resulting polymer composition. For example, the mineral fibers may have an aspect ratio of from about 1 to about 50, in some embodiments from about 2 to about 20, and in some embodiments, from about 4 to about 15. The volume average length of such mineral fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

Through the use of a liquid crystalline polymer and mineral fibers of the size noted above, the present inventors have discovered that the resulting polymer composition is able to achieve good strength and a smooth surface, which enables it to be uniquely suited for the small molded parts of a compact camera module. For example, the base may have a thickness of about 500 micrometers or less, in some embodiments from about 100 to about 450 micrometers, and in some embodiments, from about 200 to about 400 micrometers. Likewise, the lens barrel may have a wall thickness of about 500 micrometers or less, in some embodiments from about 100 to about 450 micrometers, and in some embodiments, from about 200 to about 400 micrometers. When formed from the polymer composition of the present invention, the ratio of the thickness of the base and/or lens barrel to the volume average length of the mineral fibers may be from about 1 to about 50, in some embodiments from about 2 to about 30, and in some embodiments, from about 5 to about 15.

The relative amount of the mineral fibers in the polymer composition is also selectively controlled to help achieve the desired mechanical properties without adversely impacting other properties of the composition, such as its smoothness when formed into a molded part. For example, mineral fibers typically constitute from about 5 wt. % to about 60 wt. %, in some embodiments from about 10 wt. % to about 50 wt. %, and in some embodiments, from about 20 wt. % to about 40 wt. % of the polymer composition. In addition to fibers, the polymer composition of the present invention employs at least one thermotropic liquid crystalline polymer, which has a high degree of crystallinity that enables it to effectively fill the small spaces of the mold used to form the base and/or lens barrel of a compact camera module. While the concentration of the liquid crystalline polymers may generally vary based on the presence of other optional components, they are typically present in an amount of from about 25 wt. % to about 95 wt. %, in some embodiments from about 30 wt. % to about 80 wt. %, and in some embodiments, from about 40 wt. % to about 70 wt. %.

Various embodiments of the present invention will now be described in more detail.

I. Liquid Crystalline Polymer

The thermotropic liquid crystalline polymer generally has a high degree of crystallinity that enables it to effectively fill the small spaces of a mold. Suitable thermotropic liquid crystalline polymers may include aromatic polyesters, aromatic poly(esteram ides), aromatic poly(estercarbonates), aromatic polyam ides, etc., and may likewise contain repeating units formed from one or more aromatic hydroxycarboxylic acids, aromatic dicarboxylic acids, aromatic diols, aromatic aminocarboxylic acids, aromatic amines, aromatic diamines, etc., as well as combinations thereof.

Liquid crystalline polymers are generally classified as "thermotropic" to the extent that they can possess a rod-like structure and exhibit a crystalline behavior in its molten state (e.g., thermotropic nematic state). Such polymers may be formed from one or more types of repeating units as is known in the art. The liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments from about 80 mol. % to about 99 mol. % of the polymer. The aromatic ester repeating units may be generally represented by the following Formula (I):

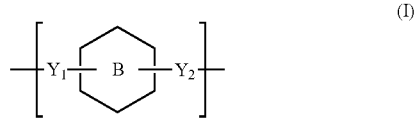

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derive from aromatic dicarboxylic acids (e.g., IA, TA, and/or NDA) typically constitute from about 5 mol. % to about 60 mol. %, in some embodiments from about 10 mol. % to about 55 mol. %, and in some embodiments, from about 15 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("HBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments, from about 25 mol. % to about 75% of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20% of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10% of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 30 mol. %, in some embodiments no more than about 15 mol. %, in some embodiments no more than about 10 mol. %, in some embodiments no more than about 8 mol. %, and in some embodiments, from 0 mol. % to about 5 mol. % of the polymer (e.g., 0 mol. %). Despite the absence of a high level of conventional naphthenic acids, it is believed that the resulting "low naphthenic" polymers are still capable of exhibiting good thermal and mechanical properties.

In one particular embodiment, the liquid crystalline polymer may be formed from repeating units derived from 4-hydroxybenzoic acid ("HBA") and terephthalic acid ("TA") and/or isophthalic acid ("IA"), as well as various other optional constituents. The repeating units derived from 4-hydroxybenzoic acid ("HBA") may constitute from about 10 mol. % to about 80 mol. %, in some embodiments from about 30 mol. % to about 75 mol. %, and in some embodiments, from about 45 mol. % to about 70% of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments, from about 15 mol. % to about 35% of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments, from about 5 mol. % to about 20% of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 35 mol. %, in some embodiments from about 2 mol. % to about 30 mol. %, and in some embodiments, from about 3 mol. % to about 25 mol. % when employed.

Regardless of the particular constituents and nature of the polymer, the liquid crystalline polymer may be prepared by initially introducing the aromatic monomer(s) used to form ester repeating units (e.g., aromatic hydroxycarboxylic acid, aromatic dicarboxylic acid, etc.) and/or other repeating units (e.g., aromatic diol, aromatic amide, aromatic amine, etc.) into a reactor vessel to initiate a polycondensation reaction. The particular conditions and steps employed in such reactions are well known, and may be described in more detail in U.S. Pat. No. 4,161,470 to Calundann; U.S. Pat. No. 5,616,680 to Linstid, III, et al.; U.S. Pat. No. 6,114,492 to Linstid, III, et al.; U.S. Pat. No. 6,514,611 to Shepherd, et al.; and WO 2004/058851 to Waggoner. The vessel employed for the reaction is not especially limited, although it is typically desired to employ one that is commonly used in reactions of high viscosity fluids. Examples of such a reaction vessel may include a stirring tank-type apparatus that has an agitator with a variably-shaped stirring blade, such as an anchor type, multistage type, spiral-ribbon type, screw shaft type, etc., or a modified shape thereof. Further examples of such a reaction vessel may include a mixing apparatus commonly used in resin kneading, such as a kneader, a roll mill, a Banbury mixer, etc.

If desired, the reaction may proceed through the acetylation of the monomers as known the art. This may be accomplished by adding an acetylating agent (e.g., acetic anhydride) to the monomers. Acetylation is generally initiated at temperatures of about 90° C. During the initial stage of the acetylation, reflux may be employed to maintain vapor phase temperature below the point at which acetic acid byproduct and anhydride begin to distill. Temperatures during acetylation typically range from between 90° C. to 150° C., and in some embodiments, from about 110° C. to about 150° C. If reflux is used, the vapor phase temperature typically exceeds the boiling point of acetic acid, but remains low enough to retain residual acetic anhydride. For example, acetic anhydride vaporizes at temperatures of about 140° C. Thus, providing the reactor with a vapor phase reflux at a temperature of from about 110° C. to about 130° C. is particularly desirable. To ensure substantially complete reaction, an excess amount of acetic anhydride may be employed. The amount of excess anhydride will vary depending upon the particular acetylation conditions employed, including the presence or absence of reflux. The use of an excess of from about 1 to about 10 mole percent of acetic anhydride, based on the total moles of reactant hydroxyl groups present is not uncommon.

Acetylation may occur in in a separate reactor vessel, or it may occur in situ within the polymerization reactor vessel. When separate reactor vessels are employed, one or more of the monomers may be introduced to the acetylation reactor and subsequently transferred to the polymerization reactor. Likewise, one or more of the monomers may also be directly introduced to the reactor vessel without undergoing pre-acetylation.

In addition to the monomers and optional acetylating agents, other components may also be included within the reaction mixture to help facilitate polymerization. For instance, a catalyst may be optionally employed, such as metal salt catalysts (e.g., magnesium acetate, tin(I) acetate, tetrabutyl titanate, lead acetate, sodium acetate, potassium acetate, etc.) and organic compound catalysts (e.g., N-methylimidazole). Such catalysts are typically used in amounts of from about 50 to about 500 parts per million based on the total weight of the recurring unit precursors. When separate reactors are employed, it is typically desired to apply the catalyst to the acetylation reactor rather than the polymerization reactor, although this is by no means a requirement.

The reaction mixture is generally heated to an elevated temperature within the polymerization reactor vessel to initiate melt polycondensation of the reactants. Polycondensation may occur, for instance, within a temperature range of from about 250° C. to about 400° C., in some embodiments from about 280° C. to about 395° C., and in some embodiments, from about 300° C. to about 380° C. For instance, one suitable technique for forming the liquid crystalline polymer may include charging precursor monomers and acetic anhydride into the reactor, heating the mixture to a temperature of from about 90° C. to about 150° C. to acetylize a hydroxyl group of the monomers (e.g., forming acetoxy), and then increasing the temperature to from about 250° C. to about 400° C. to carry out melt polycondensation. As the final polymerization temperatures are approached, volatile byproducts of the reaction (e.g., acetic acid) may also be removed so that the desired molecular weight may be readily achieved. The reaction mixture is generally subjected to agitation during polymerization to ensure good heat and mass transfer, and in turn, good material homogeneity. The rotational velocity of the agitator may vary during the course of the reaction, but typically ranges from about 10 to about 100 revolutions per minute ("rpm"), and in some embodiments, from about 20 to about 80 rpm. To build molecular weight in the melt, the polymerization reaction may also be conducted under vacuum, the application of which facilitates the removal of volatiles formed during the final stages of polycondensation. The vacuum may be created by the application of a suctional pressure, such as within the range of from about 5 to about 30 pounds per square inch ("psi"), and in some embodiments, from about 10 to about 20 psi.

Following melt polymerization, the molten polymer may be discharged from the reactor, typically through an extrusion orifice fitted with a die of desired configuration, cooled, and collected. Commonly, the melt is discharged through a perforated die to form strands that are taken up in a water bath, pelletized and dried. In some embodiments, the melt polymerized polymer may also be subjected to a subsequent solid-state polymerization method to further increase its molecular weight. Solid-state polymerization may be conducted in the presence of a gas (e.g., air, inert gas, etc.). Suitable inert gases may include, for instance, include nitrogen, helium, argon, neon, krypton, xenon, etc., as well as combinations thereof. The solid-state polymerization reactor vessel can be of virtually any design that will allow the polymer to be maintained at the desired solid-state polymerization temperature for the desired residence time. Examples of such vessels can be those that have a fixed bed, static bed, moving bed, fluidized bed, etc. The temperature at which solid-state polymerization is performed may vary, but is typically within a range of from about 250° C. to about 350° C. The polymerization time will of course vary based on the temperature and target molecular weight. In most cases, however, the solid-state polymerization time will be from about 2 to about 12 hours, and in some embodiments, from about 4 to about 10 hours.

II. Optional Components

A. Conductive Filler

If desired, a conductive filler may be employed in the polymer composition to help reduce the tendency to create a static electric charge during a molding operation. In fact, the present inventors have discovered that the presence of a controlled size and amount of the mineral fibers, as noted above, can enhance the ability of the conductive filler to be dispersed within the liquid crystalline polymer matrix, thereby allowing allow for the use of relatively low concentrations of the conductive filler to achieve the desired antistatic properties. Because it is employed in relatively low concentrations, however, the impact on thermal and mechanical properties can be minimized. In this regard, conductive fillers, when employed, typically constitute from about 0.1 wt. % to about 25 wt. %, in some embodiments from about 0.3 wt. % to about 10 wt. %, in some embodiments from about 0.4 wt. % to about 3 wt. %, and in some embodiments, from about 0.5 wt. % to about 1.5 wt. % of the polymer composition.

Any of a variety of conductive fillers may generally be employed in the polymer composition to help improve its antistatic characteristics. Examples of suitable conductive fillers may include, for instance, metal particles (e.g., aluminum flakes), metal fibers, carbon particles (e.g., graphite, expanded graphite, grapheme, carbon black, graphitized carbon black, etc.), carbon nanotubes, carbon fibers, and so forth. Carbon fibers and carbon particles (e.g., graphite) are particularly suitable. When employed, suitable carbon fibers may include pitch-based carbon (e.g., tar pitch), polyacrylonitrile-based carbon, metal-coated carbon, etc. Desirably, the carbon fibers have a high purity in that they possess a relatively high carbon content, such as a carbon content of about 85 wt. % or more, in some embodiments about 90 wt. % or more, and in some embodiments, about 93 wt. % or more. For instance, the carbon content can be at least about 94% wt., such as at least about 95% wt., such as at least about 96% wt., such at least about 97% wt., such as even at least about 98% wt. The carbon purity is generally less than 100 wt. %, such as less than about 99 wt. %. The density of the carbon fibers is typically from about 0.5 to about 3.0 g/cm$^3$, in some embodiments from about 1.0 to about 2.5 g/cm$^3$, and in some embodiments, from about 1.5 to about 2.0 g/cm$^3$.

In one embodiment, the carbon fibers are incorporated into the matrix with minimal fiber breakage. The volume average length of the fibers after molding can generally be from about 0.1 mm to about 1 mm even when using a fiber having an initial length of about 3 mm. The average length and distribution of the carbon fibers can also be selectively controlled in the final polymer composition to achieve a better connection and electrical pathway within the liquid crystalline polymer matrix. The average diameter of the fibers can be from about 0.5 to about 30 micrometers, in some embodiments from about 1 to about 20 micrometers, and in some embodiments, from about 3 to about 15 micrometers.

To improve dispersion within the polymer matrix, the carbon fibers may be at least partially coated with a sizing agent that increases the compatibility of the carbon fibers with the liquid crystalline polymer. The sizing agent may be stable so that it does not thermally degrade at temperatures at which the liquid crystalline polymer is molded. In one embodiment, the sizing agent may include a polymer, such as an aromatic polymer. For instance, the aromatic polymer may have a thermal decomposition temperature of greater than about 300° C., such as greater than about 350° C., such as greater than about 400° C. As used herein, the thermal decomposition temperature of a material is the temperature at which the material losses 5% of its mass during thermogravimeteric analysis as determined in accordance with ASTM Test E 1131 (or ISO Test 11358). The sizing agent can also have a relatively high glass transition temperature. For instance, the glass transition temperature of the sizing agent can be greater than about 300° C., such as greater than about 350° C., such as greater than about 400° C. Particular examples of sizing agents include polyimide polymers, aromatic polyester polymers including wholly aromatic polyester polymers, and high temperature epoxy polymers. In one embodiment, the sizing agent may include a liquid crystalline polymer. The sizing agent can be present on the fibers in an amount of at least about 0.1% wt., such as in an amount of at least 0.2% wt., such as in an amount of at least about 0.1% wt. The sizing agent is generally present in an amount less than about 5% wt., such as in an amount of less than about 3% wt.

Another suitable conductive filler is an ionic liquid. One benefit of such a material is that, in addition to being electrically conductive, the ionic liquid can also exist in liquid form during melt processing, which allows it to be more uniformly blended within the liquid crystalline polymer matrix. This improves electrical connectivity and thereby enhances the ability of the composition to rapidly dissipate static electric charges from its surface.

The ionic liquid is generally a salt that has a low enough melting temperature so that it can be in the form of a liquid when melt processed with the liquid crystalline polymer. For example, the melting temperature of the ionic liquid may be about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, quaternary oniums having the following structures:

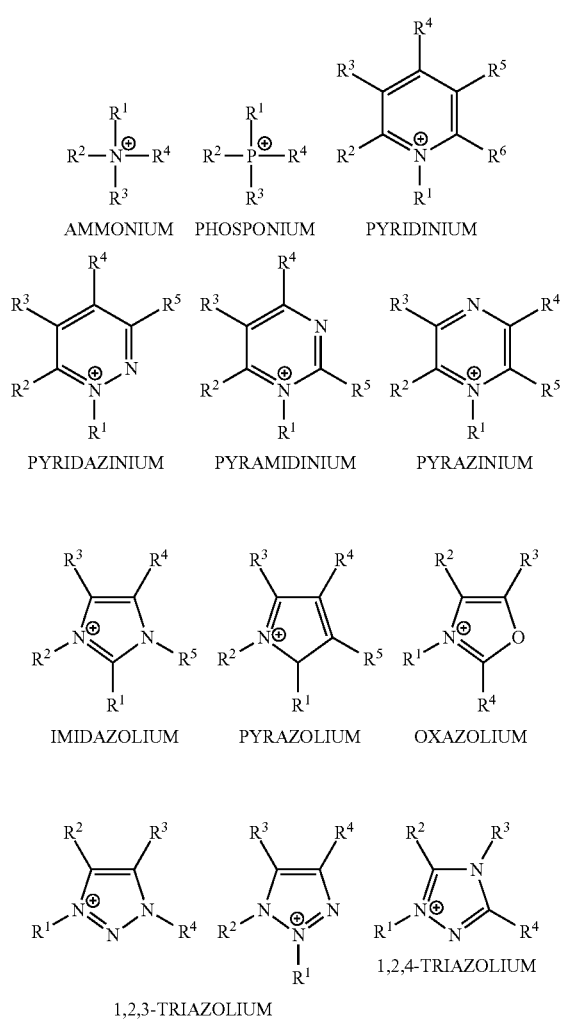

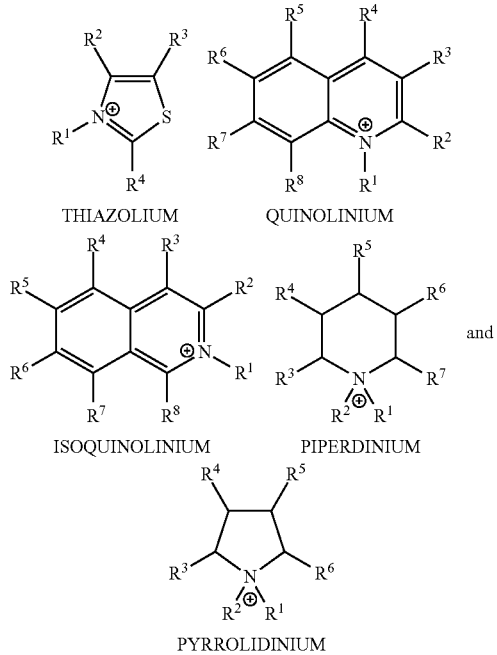

wherein, $R^1$, $R^2$, $R^3$, $R^4$, $R^5$, $R^6$, $R^7$, and $R^8$ are independently selected from the group consisting of hydrogen; substituted or unsubstituted $C_1$-$C_{10}$ alkyl groups (e.g., methyl, ethyl, n-propyl, isopropyl, n-butyl, isobutyl, sec-butyl, tert-butyl, n-pentyl, etc.); substituted or unsubstituted $C_3$-$C_{14}$ cycloalkyl groups (e.g., adamantyl, cyclopropyl, cyclobutyl, cyclopentyl, cyclooctyl, cyclohexenyl, etc.); substituted or unsubstituted $C_1$-$C_{10}$ alkenyl groups (e.g., ethylene, propylene, 2-methypropylene, pentylene, etc.); substituted or unsubstituted $C_2$-$C_{10}$ alkynyl groups (e.g., ethynyl, propynyl, etc.); substituted or unsubstituted $C_1$-$C_{10}$ alkoxy groups (e.g., methoxy, ethoxy, n-propoxy, isopropoxy, n-butoxy, t-butoxy, sec-butoxy, n-pentoxy, etc.); substituted or unsubstituted acyloxy groups (e.g., methacryloxy, methacryloxyethyl, etc.); substituted or unsubstituted aryl groups (e.g., phenyl); substituted or unsubstituted heteroaryl groups (e.g., pyridyl, furanyl, thienyl, thiazolyl, isothiazolyl, triazolyl, imidazolyl, isoxazolyl, pyrrolyl, pyrazolyl, pyridazinyl, pyrimidinyl, quinolyl, etc.); and so forth. In one particular embodiment, for example, the cationic species may be an ammonium compound having the structure $N^+R^1R^2R^3R^4$, wherein $R^1$, $R^2$, and/or $R^3$ are independently a $C_1$-$C_6$ alkyl (e.g., methyl, ethyl, butyl, etc.) and $R^4$ is hydrogen or a $C_1$-$C_4$ alkyl group (e.g., methyl or ethyl). For example, the cationic component may be tri-butylmethylammonium, wherein $R^1$, $R^2$, and $R^3$ are butyl and $R^4$ is methyl.

Suitable counterions for the cationic species may include, for example, halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing. To help improve compatibility with the liquid crystalline polymer, it may be desired to select a counterion that is generally hydrophobic in nature, such as imides, fatty acid carboxylates, etc. Particularly suitable hydrophobic counterions may include, for instance, bis(pentafluoroethylsulfonyl)imide, bis(trifluoromethylsulfonyl)imide, and bis(trifluoromethyl)imide.

In certain embodiments, a synergistic affect may be achieved by using the ionic liquid and a carbon filler (e.g., graphite, carbon fibers, etc.) in combination. Without intending to be limited by theory, the present inventor believes that the ionic liquid is able to readily flow during melt processing to help provide a better connection and electrical pathway between the carbon filler and the liquid crystalline polymer matrix, thereby further reducing surface resistivity.

B. Glass Fillers

Glass fillers, which are not generally conductive, may also be employed in the polymer composition to help improve strength. For example, glass fillers may constitute from about 2 wt. % to about 40 wt. %, in some embodiments from about 5 wt. % to about 35 wt. %, and in some embodiments, from about 6 wt. % to about 30 wt. % of the polymer composition. Glass fibers are particularly suitable for use in the present invention, such as those formed from E-glass, A-glass, C-glass, D-glass, AR-glass, R-glass, S1-glass, S2-glass, etc., as well as mixtures thereof. The median width of the glass fibers may be relatively small, such as from about 1 to about 35 micrometers, in some embodiments from about 2 to about 20 micrometers, and in some embodiments, from about 3 to about 10 micrometers. When employed, it is believed that the small diameter of such glass fibers can allow their length to be more readily reduced during melt blending, which can further improve surface appearance and mechanical properties. In the molded part, for example, the volume average length of the glass fibers may be relatively small, such as from about 10 to about 500 micrometers, in some embodiments from about 100 to about 400 micrometers, in some embodiments from about 150 to about 350 micrometers, and in some embodiments, from about 200 to about 325 micrometers. The glass fibers may also have a relatively high aspect ratio (average length divided by nominal diameter), such as from about 1 to about 100, in some embodiments from about 10 to about 60, and in some embodiments, from about 30 to about 50.

C. Particulate Fillers

Particulate fillers, which are not generally conductive, may also be employed in the polymer composition to help achieve the desired properties and/or color. When employed, such particulate fillers typically constitute from about 5% by weight to about 40% by weight, in some embodiments from about 10% by weight to about 35% by weight, and in some embodiments, from about 10% by weight to about 30% by weight of the polymer composition. Particulate clay minerals may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K,H_3O)(Al,Mg,Fe)_2(Si,Al)_4O_{10}[(OH)_2,(H_2O)]$), montmorillonite (($Na,Ca)_{0.33}(Al,Mg)_2Si_4O_{10}(OH)_2 \cdot nH_2O$), vermiculite (($MgFe,Al)_3(Al,Si)_4O_{10}(OH)_2 \cdot 4H_2O$), palygorskite (($Mg,Al)_2Si_4O_{10}(OH) \cdot 4(H_2O)$), pyrophyllite ($Al_2Si_4O_{10}(OH)_2$), etc., as well as combinations thereof. In lieu of, or in addition to, clay minerals, still other particulate fillers may also be employed. For example, other suitable particulate silicate fillers may also be employed, such as mica, diatomaceous earth, and so forth. Mica, for instance, may be a particularly suitable mineral for use in the present invention. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite (($K,Na)(Al,Mg,Fe)_2(Si,Al)_4O_{10}(OH)_2$), etc., as well as combinations thereof.

D. Functional Compounds

If desired, functional compounds may also be employed in the present invention to, among other things, help reduce the melt viscosity of the polymer composition. In one embodiment, for example, the polymer composition of the present invention may contain a functional aromatic compound. Such compounds typically contain one or more carboxyl and/or hydroxyl functional groups that can react with the polymer chain to shorten its length, thus reducing the melt viscosity. In certain cases, the compound may also be able to combine smaller chains of the polymer together after they have been cut to help maintain the mechanical properties of the composition even after its melt viscosity has been reduced. The functional aromatic compound may have the general structure provided below in Formula (II):

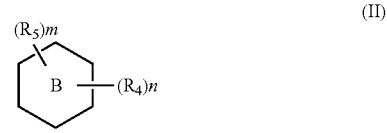

(II)

or a metal salt thereof, wherein, ring B is a 6-membered aromatic ring wherein 1 to 3 ring carbon atoms are optionally replaced by nitrogen or oxygen, wherein each nitrogen is optionally oxidized, and wherein ring B may be optionally fused or linked to a 5- or 6-membered aryl, heteroaryl, cycloalkyl, or heterocyclyl;

$R_4$ is OH or COOH;

$R_5$ is acyl, acyloxy (e.g., acetyloxy), acylamino (e.g., acetylamino), alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycloxy;

m is from 0 to 4, in some embodiments from 0 to 2, and in some embodiments, from 0 to 1; and n is from 1 to 3, and in some embodiments, from 1 to 2. When the compound is in the form of a metal salt, suitable metal counterions may include transition metal counterions (e.g., copper, iron, etc.), alkali metal counterions (e.g., potassium, sodium, etc.), alkaline earth metal counterions (e.g., calcium, magnesium, etc.), and/or main group metal counterions (e.g., aluminum).

In one embodiment, for example, B is phenyl in Formula (II) such that the resulting phenolic compounds have the following general formula (III):

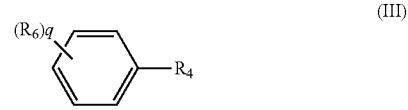

(III)

or a metal salt thereof, wherein, $R_4$ is OH or COOH;

$R_6$ is acyl, acyloxy, acylamino, alkoxy, alkenyl, alkyl, amino, carboxyl, carboxyl ester, hydroxyl, halo, or haloalkyl; and q is from 0 to 4, in some embodiments from 0 to 2, and in some embodiments, from 0 to 1. Particular examples of such phenolic compounds include, for instance, benzoic acid (q is 0); 4-hydroxybenzoic acid ($R_4$ is COOH, $R_6$ is OH, and q is 1); phthalic acid ($R_4$ is COOH, $R_6$ is COOH, and q is 1); isophthalic acid ($R_4$ is COOH, $R_6$ is COOH, and q is 1); terephthalic acid ($R_4$ is COOH, $R_6$ is COOH, and q is 1); 2-methylterephthalic acid ($R_4$ is COOH, $R_6$ is COOH, and $CH_3$ and q is 2); phenol ($R_4$ is OH and q is 0); sodium phenoxide ($R_4$ is OH and q is 0); hydroquinone ($R_4$ is OH, $R_6$ is OH, and q is 1); resorcinol ($R_4$ is OH, $R_6$ is OH, and q is 1); 4-hydroxybenzoic acid ($R_4$ is OH, $R_6$ is C(O)OH, and q is 1), etc., as well as combinations thereof.

In another embodiment, B is phenyl and $R_5$ is phenyl in Formula (II) above such that the diphenolic compounds have the following general formula (IV):

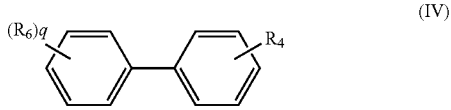

(IV)

or a metal salt thereof, wherein, $R_4$ is COOH or OH;

$R_6$ is acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycloxy; and q is from 0 to 4, in some embodiments from 0 to 2, and in some embodiments, from 0 to 1. Particular examples of such diphenolic compounds include, for instance, 4-hydroxy-4'-biphenylcarboxylic acid ($R_4$ is COOH, $R_6$ is OH, and q is 1); 4'-hydroxyphenyl-4-benzoic acid ($R_4$ is COOH, $R_6$ is OH, and q is 1); 3'-hydroxyphenyl-4-benzoic acid ($R_4$ is COOH, $R_6$ is OH, and q is 1); 4'-hydroxyphenyl-3-benzoic acid ($R_4$ is COOH, $R_6$ is OH, and q is 1); 4,4'-bibenzoic acid ($R_4$ is COOH, $R_6$ is COOH, and q is 1); ($R_4$ is OH, $R_6$ is OH, and q is 1); 3,3'-biphenol ($R_4$ is OH, $R_6$ is OH, and q is 1); 3,4'-biphenol ($R_4$ is OH, $R_6$ is OH, and q is 1); 4-phenylphenol ($R_4$ is OH and q is O); bis(4-hydroxyphenyl)ethane ($R_4$ is OH, $R_6$ is $C_2(OH)_2$phenol, and q is 1); tris(4-hydroxyphenyl)ethane ($R_4$ is OH, $R_6$ is $C(CH_3)$biphenol, and q is 1); 4-hydroxy-4'-biphenylcarboxylic acid ($R_4$ is OH, $R_6$ is COOH, and q is 1); 4'-hydroxyphenyl-4-benzoic acid ($R_4$ is OH, $R_6$ is COOH, and q is 1); 3'-hydroxyphenyl-4-benzoic acid ($R_4$ is OH, $R_6$ is COOH, and q is 1); 4'-hydroxyphenyl-3-benzoic acid ($R_4$ is OH, $R_6$ is COOH, and q is 1); etc., as well as combinations thereof.

In yet another embodiment, B is naphthenyl in Formula (II) above such that the resulting naphthenic compounds have the following general formula (V):

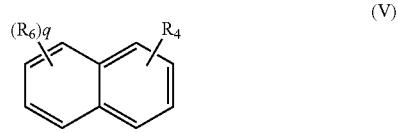

(V)

or a metal salt thereof, wherein, $R_4$ is OH or COOH;

$R_6$ is acyl, acyloxy, acylamino, alkoxy, alkenyl, alkyl, amino, aryl, aryloxy, carboxyl, carboxyl ester, cycloalkyl, cycloalkyloxy, hydroxyl, halo, haloalkyl, heteroaryl, heteroaryloxy, heterocyclyl, or heterocycloxy; and q is from 0 to 4, in some embodiments from 0 to 2, and in some embodiments, from 0 to 1. Particular examples of such naphthenic compounds include, for instance, 1-naphthoic acid ($R_4$ is COOH and q is 0); 2-naphthoic acid ($R_4$ is COOH and q is 0); 2-hydroxy-6-naphthoic acid ($R_4$ is COOH, $R_6$ is OH, and q is 1); 2-hydroxy-5-naphthoic acid ($R_4$ is COOH, $R_6$ is OH, and q is 1); 3-hydroxy-2-naphthoic acid ($R_4$ is COOH, $R_6$ is OH, and q is 1); 2-hydroxy-3-naphthoic acid ($R_4$ is COOH, $R_6$ is OH, and q is 1); 2,6-naphthalenedicarboxylic acid ($R_4$ is COOH, $R_6$ is COOH, and q is 1); 2,3-naphthalenedicarboxylic acid ($R_4$ is COOH, $R_6$ is COOH, and q is 1); 2-hydroxy-naphthelene ($R_4$ is OH and q is 0); 2-hydroxy-6-naphthoic acid ($R_4$ is OH, $R_6$ is COOH, and q is 1); 2-hydroxy-5-naphthoic acid ($R_4$ is OH, $R_6$ is COOH, and q is 1); 3-hydroxy-2-naphthoic acid ($R_4$ is OH, $R_6$ is COOH, and q is 1); 2-hydroxy-3-naphthoic acid ($R_4$ is OH, $R_6$ is COOH, and q is 1); 2,6-dihydroxynaphthalene ($R_4$ is OH, $R_6$ is OH, and q is 1); 2,7-dihydroxynaphtalene ($R_4$ is OH, $R_6$ is OH, and q is 1); 1,6-dihydroxynaphthalene ($R_4$ is OH, $R_6$ is OH, and q is 1), etc., as well as combinations thereof.

In certain embodiments of the present invention, for example, the polymer composition may contain an aromatic diol, such as hydroquinone, resorcinol, 4,4'-biphenol, etc., as well as combinations thereof. When employed, such aromatic diols may constitute from about 0.01 wt. % to about 1 wt. %, and in some embodiments, from about 0.05 wt. % to about 0.4 wt. % of the polymer composition. An aromatic carboxylic acid may also be employed in certain embodiments, either alone or in conjunction with the aromatic diol. Aromatic carboxylic acids may constitute from about 0.001 wt. % to about 0.5 wt. %, and in some embodiments, from about 0.005 wt. % to about 0.1 wt. % of the polymer composition. In particular embodiments, a combination of an aromatic diol ($R_4$ and $R_6$ are OH in the formulae above) (e.g., 4,4'-biphenol) and an aromatic dicarboxylic acid ($R_4$ and $R_6$ are COOH in the formulae above) (e.g., 2,6-naphthelene dicarboxylic acid) is employed in the present invention to help achieve the desired viscosity reduction.

In addition to those noted above, non-aromatic functional compounds may also be employed in the present invention. Such compounds may serve a variety of purposes, such as reducing melt viscosity. One such non-aromatic functional compound is water. If desired, water can be added in a form that under process conditions generates water. For example, the water can be added as a hydrate that under the process conditions (e.g., high temperature) effectively "loses" water. Such hydrates include alumina trihydrate, copper sulfate pentahydrate, barium chloride dihydrate, calcium sulfate dehydrate, etc., as well as combinations thereof. When employed, the hydrates may constitute from about 0.02 wt. % to about 2 wt. %, and in some embodiments, from about 0.05 wt. % to about 1 wt. % of the polymer composition. In one particular embodiment, a mixture of an aromatic diol, hydrate, and aromatic dicarboxylic acid are employed in the composition. In such embodiments, the weight ratio of hydrates to aromatic diols is typically from about 0.5 to about 8, in some embodiments from about 0.8 to about 5, and in some embodiments, from about 1 to about 5.

E. Other Additives

Still other additives that can be included in the composition may include, for instance, antimicrobials, pigments, antioxidants, stabilizers, surfactants, waxes, solid solvents, flame retardants, anti-drip additives, and other materials added to enhance properties and processability. Lubricants may also be employed in the polymer composition that are capable of withstanding the processing conditions of the liquid crystalline polymer without substantial decomposition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palm itic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisam ides and alkanolam ides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

III. Formation

The liquid crystalline polymer, mineral fibers, and other optional additives may be melt processed or blended together within a temperature range of from about 250° C. to about 450° C., in some embodiments, from about 280° C. to about 400° C., and in some embodiments, from about 300° C. to about 380° C. to form the polymer composition. For example, the components (e.g., liquid crystalline polymer, mineral fibers, etc.) may be supplied separately or in combination to an extruder that includes at least one screw rotatably mounted and received within a barrel (e.g., cylindrical barrel) and may define a feed section and a melting section located downstream from the feed section along the length of the screw.

Figure 3:
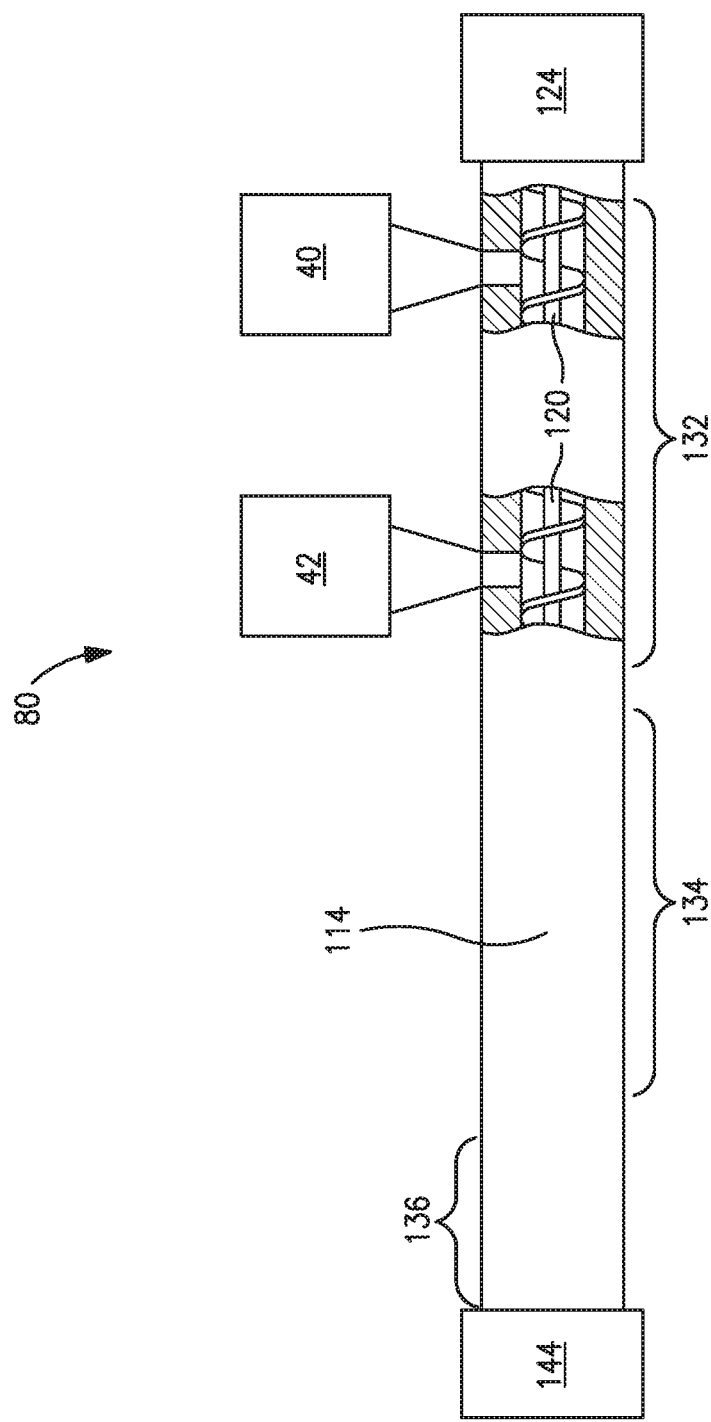
FIG. 3 is a schematic illustration of one embodiment of an extruder screw that may be used to form the polymer composition of the present invention.

The extruder may be a single screw or twin screw extruder. Referring to FIG. 3, for example, one embodiment of a single screw extruder 80 is shown that contains a housing or barrel 114 and a screw 120 rotatably driven on one end by a suitable drive 124 (typically including a motor and gearbox). If desired, a twin-screw extruder may be employed that contains two separate screws. The configuration of the screw is not particularly critical to the present invention and it may contain any number and/or orientation of threads and channels as is known in the art. As shown in FIG. 3, for example, the screw 120 contains a thread that forms a generally helical channel radially extending around a core of the screw 120. A hopper 40 is located adjacent to the drive 124 for supplying the liquid crystalline polymer and/or other materials (e.g., mineral fibers) through an opening in the barrel 114 to the feed section 132. Opposite the drive 124 is the output end 144 of the extruder 80, where extruded plastic is output for further processing.

A feed section 132 and melt section 134 are defined along the length of the screw 120. The feed section 132 is the input portion of the barrel 114 where the liquid crystalline polymer, mineral fibers, and/or the functional compound are added. The melt section 134 is the phase change section in which the liquid crystalline polymer is changed from a solid to a liquid. While there is no precisely defined delineation of these sections when the extruder is manufactured, it is well within the ordinary skill of those in this art to reliably identify the feed section 132 and the melt section 134 in which phase change from solid to liquid is occurring. Although not necessarily required, the extruder 80 may also have a mixing section 136 that is located adjacent to the output end of the barrel 114 and downstream from the melting section 134. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

The mineral fibers can be added to the hopper 40 or at a location downstream therefrom. In one particular embodiment, the mineral fibers may be added a location downstream from the point at which the liquid crystalline polymer is supplied. In this manner, the degree to which the length of the microfibers is reduced can be minimized, which helps maintain the desired aspect ratio. If desired, the ratio of the length ("L") to diameter ("D") of the screw may be selected to achieve an optimum balance between throughput and maintenance of the mineral fiber aspect ratio. The L/D value may, for instance, range from about 15 to about 50, in some embodiments from about 20 to about 45, and in some embodiments from about 25 to about 40. The length of the screw may, for instance, range from about 0.1 to about 5 meters, in some embodiments from about 0.4 to about 4 meters, and in some embodiments, from about 0.5 to about 2 meters. The diameter of the screw may likewise be from about 5 to about 150 millimeters, in some embodiments from about 10 to about 120 millimeters, and in some embodiments, from about 20 to about 80 millimeters. The L/D ratio of the screw after the point at which the mineral fibers are supplied may also be controlled within a certain range. For example, the screw has a blending length ("$L_B$") that is defined from the point at which the fibers are supplied to the extruder to the end of the screw, the blending length being less than the total length of the screw. The $L_B$/D ratio of the screw after the point at which the mineral fibers are supplied may, for instance, range from about 4 to about 20, in some embodiments from about 5 to about 15, and in some embodiments, from about 6 to about 10.

In addition to the length and diameter, other aspects of the extruder may also be controlled. For example, the speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Regardless of the particular manner in which it is formed, the present inventors have discovered that the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 0.1 to about 150 Pa-s, in some embodiments from about 0.5 to about 120 Pa-s, and in some embodiments, from about 1 to about 100 Pa-s, determined at a shear rate of 1000 seconds$^{-1}$. Melt viscosity may be determined in accordance with ISO Test No. 11443 at a temperature that is 15° C. higher than the melting temperature of the composition (e.g., 350° C.). The composition may also have a relatively high melting temperature. For example, the melting temperature of the polymer may be from about 250° C. to about 400° C., in some embodiments from about 280° C. to about 395° C., and in some embodiments, from about 300° C. to about 380° C.

IV. Compact Camera Module

Once formed, the polymer composition may be molded into a shaped part for use in a compact camera module. For example, the shaped part may be molded using a one-component injection molding process in which dried and preheated plastic granules are injected into the mold. Regardless of the technique employed, it has been discovered that the molded part of the present invention may have a relatively smooth surface, which may be represented by its surface glossiness). For example, the surface glossiness as determined using a gloss meter at an angle of from about 80° to about 85° may be about 35% or more, in some embodiments about 38% or more, and in some embodiments, from about 40% to about 60%. Conventionally, it was believed that parts having such a smooth surface would not also possess sufficiently good mechanical properties. Contrary to conventional thought, however, the molded part of the present invention has been found to possess excellent mechanical properties. For example, the part may possess a high weld strength, which is useful when forming the thin part of a compact camera module. For example, the part may exhibit a weld strength of from about 10 kilopascals ("kPa") to about 100 kPa, in some embodiments from about 20 kPa to about 80 kPa, and in some embodiments, from about 40 kPa to about 70 kPa, which is the peak stress as determined in accordance with ISO Test No. 527 (technically equivalent to ASTM D638) at 23° C.

The part may also possess a Charpy notched impact strength greater than about 3 kJ/m$^2$, greater than about 4 kJ/m$^2$, in some embodiments from about 5 to about 40 kJ/m$^2$, and in some embodiments, from about 6 to about 30 kJ/m$^2$, measured at 23° C. according to ISO Test No. 179-1) (technically equivalent to ASTM D256, Method B). The tensile and flexural mechanical properties are also good. For example, the part may exhibit a tensile strength of from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 5,000 MPa to about 20,000 MPa, in some embodiments from about 8,000 MPa to about 20,000 MPa, and in some embodiments, from about 10,000 MPa to about 15,000 MPa. The tensile properties may be determined in accordance with ISO Test No. 527 (technically equivalent to ASTM D638) at 23° C. The part may also exhibit a flexural strength of from about 20 to about 500 MPa, in some embodiments from about 50 to about 400 MPa, and in some embodiments, from about 100 to about 350 MPa; a flexural break strain of about 0.5% or more, in some embodiments from about 0.6% to about 10%, and in some embodiments, from about 0.8% to about 3.5%; and/or a flexural modulus of from about 5,000 MPa to about 20,000 MPa, in some embodiments from about 8,000 MPa to about 20,000 MPa, and in some embodiments, from about 10,000 MPa to about 15,000 MPa. The flexural properties may be determined in accordance with ISO Test No. 178 (technically equivalent to ASTM D790) at 23° C. The molded part may also exhibit a deflection temperature under load (DTUL) of about 200° C. or more, and in some embodiments, from about 200° C. to about 280° C., as measured according to ASTM D648-07 (technically equivalent to ISO Test No. 75-2) at a specified load of 1.8 MPa.

In addition, the molded part can also have excellent antistatic behavior, particularly when a conductive filler is included within the polymer composition. Such antistatic behavior can be characterized by a relatively low surface and/or volume resistivity as determined in accordance with IEC 60093. For example, the molded part may exhibit a surface resistivity of about $1 \times 10^{15}$ ohms or less, in some embodiments about $1 \times 10^{14}$ ohms or less, in some embodiments from about $1 \times 10^{10}$ ohms to about $9 \times 10^{13}$ ohms, and in some embodiments, from about $1 \times 10^{11}$ to about $1 \times 10^{13}$ ohms. Likewise, the molded part may also exhibit a volume resistivity of about $1 \times 10^{15}$ ohm-m or less, in some embodiments from about $1 \times 10^{10}$ ohm-m to about $9 \times 10^{14}$ ohm-m, and in some embodiments, from about $1 \times 10^{11}$ to about $5 \times 10^{14}$ ohm-m. Of course, such antistatic behavior is by no means required. For example, in some embodiments, the molded part may exhibit a relatively high surface resistivity, such as about $1 \times 10^{15}$ ohms or more, in some embodiments about $1 \times 10^{16}$ ohms or more, in some embodiments from about $1 \times 10^{17}$ ohms to about $9 \times 10^{30}$ ohms, and in some embodiments, from about $1 \times 10^{18}$ to about $1 \times 10^{26}$ ohms.

Figure 2:
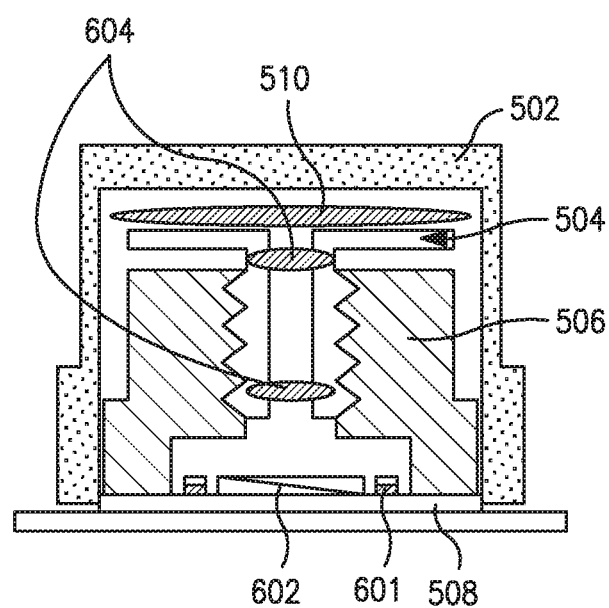

The polymer composition and molded part of the present invention may be employed in a wide variety of compact camera module configurations. One particularly suitable compact camera module is shown in FIGS. 1-2. As shown, a compact camera module 500 contains a lens assembly 504 that overlies a base 506. The base 506, in turn, overlies an optional main board 508. Due to their relatively thin nature, the base 506 and/or main board 508 are particularly suited to be molded from the polymer composition of the present invention as described above. The lens assembly 504 may have any of a variety of configurations as is known in the art. In one embodiment, for example, the lens assembly 504 is in the form of a hollow barrel that houses lenses 604, which are in communication with an image sensor 602 positioned on the main board 508 and controlled by a circuit 601. The barrel may have any of a variety of shapes, such as rectangular, cylindrical, etc. In certain embodiments, the barrel may be formed from the polymer composition of the present invention and have a wall thickness within the ranges noted above. It should be understood that other parts of the camera module may also be formed from the polymer composition of the present invention. For example, as shown, a polymer film 510 (e.g., polyester film) and/or thermal insulating cap 502 may cover the lens assembly 504. In some embodiments, the film 510 and/or cap 502 may also be formed from the polymer composition.

The present invention may be better understood with reference to the following examples.

TEST METHODS

Melt Viscosity: The melt viscosity (Pa-s) may be determined in accordance with ISO Test No. 11443 at a shear rate of 1000 s$^{-1}$ and temperature 15° C. above the melting temperature (e.g., 350° C.) using a Dynisco LCR7001 capillary rheometer. The rheometer orifice (die) had a diameter of 1 mm, length of 20 mm, L/D ratio of 20.1, and an entrance angle of 180°. The diameter of the barrel was 9.55 mm +0.005 mm and the length of the rod was 233.4 mm.

Melting Temperature: The melting temperature ("Tm") was determined by differential scanning calorimetry ("DSC") as is known in the art. The melting temperature is the differential scanning calorimetry (DSC) peak melt temperature as determined by ISO Test No. 11357. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Tensile Modulus, Tensile Stress, and Tensile Elongation: Tensile properties are tested according to ISO Test No. 527 (technically equivalent to ASTM D638). Modulus and strength measurements are made on the same test strip sample having a length of 80 mm, thickness of 10 mm, and width of 4 mm. The testing temperature is 23° C., and the testing speeds are 1 or 5 mm/min.

Flexural Modulus, Flexural Stress, and Flexural Strain: Flexural properties are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C.

Weldline Strength: The weldline strength may be determined by first forming an injection molded line grid array ("LGA") connector (size of 49 mm×39 mm×1 mm) from a polymer composition sample as is well known in the art. Once formed, the LGA connector may be placed on a sample holder. The center of the connector may be subjected to a tensile force by a rod moving at a speed of 5.08 millimeters per minute. The peak stress may be recorded as an estimate of the weldline strength.

Surface Glossiness: A gloss meter may be used to measure the glossiness of a surface. Glossiness readings may be taken at two different locations of the surface at an incident light angle of 85° relative to the surface of the part, with three repeat measurements at each location. The average of the readings may be taken for calculating the glossiness. Any suitable gloss meter may be used to measure glossiness, such as Micro-TRI-Gloss from BYK Gardner GmbH.

EXAMPLE 1

Samples 1-5 are formed from various percentages of a liquid crystalline polymer, wollastonite (Nyglos® 4W or 8), anhydrous calcium sulfate, lubricant (Glycolube™ P), conductive filler, and black color masterbatch, as indicated in Table 1 below. The black color masterbatch contains 80 wt. % liquid crystalline polymer and 20 wt. % carbon black. In Samples 1-5, the conductive filler includes carbon fibers. In Sample 6, the conductive filler also includes graphite. Finally, in Sample 7, the conductive filler is an ionic liquid —i.e., tri-n-butylmethylammonium bis(trifluoromethanesulfonyl)-imide (FC-4400 from 3M). The liquid crystalline polymer in each of the samples is formed from HBA, HNA, TA, BP, and APAP, such as described in U.S. Pat. No. 5,508,374 to Lee, et al. A comparative sample (Comp. Sample 1) is also formed without wollastonite. Compounding is performed using an 18-mm single screw extruder. Parts are injection molded the samples into plaques (60 mm×60 mm).

TABLE 1

|  | Comp. Sample 1 | Sample 1 | Sample 2 | Sample 3 | Sample 4 | Sample 5 | Sample 6 | Sample 7 |
| --- | --- | --- | --- | --- | --- | --- | --- | --- |
| LCP (wt. %) | 47.2 | 77.2 | 67.2 | 57.2 | 67.2 | 37.2 | 56.4 | 36.4 |
| Glass Powder (wt. %) | 10.0 | — | — | — | — | — | — | — |
| Talc (wt. %) | 30.0 | — | — | — | — | — | — | — |
| Lubricant (wt. %) | 0.3 | 0.3 | 0.3 | 0.3 | 0.3 | 0.3 | 0.3 | 0.3 |
| Vectra ® A625 | — | — | — | — | — | 30.0 | — | 20.0 |
| FC-4400 | — | — | — | — | — | — | 0.8 | 0.8 |
| Black Color Masterbatch | 12.5 | 12.5 | 12.5 | 12.5 | 12.5 | 12.5 | 12.5 | 12.5 |
| Nyglos ® 4W | — | 10.0 | 20.0 | 30.0 | — | 20.0 | 10.0 | 30.0 |
| Nyglos ® 8 | — | — | — | — | 20.0 | — | — | — |
| Anhydrous Calcium Sulfate | — | — | — | — | — | — | 20.0 | — |

Some of the molded parts are also tested for thermal and mechanical properties. The results are set forth below in Table 2.

TABLE 2

|  | Sample 6 | Sample 7 |
|---|---|---|
| Melt Viscosity at 1000 s$^{-1}$ and 350° C. (Pa-s) | 48.6 | 51.6 |
| Melt Viscosity at 400 s$^{-1}$ and 350° C. (Pa-s) | 78.5 | 78.6 |
| Tm (° C.) | 330.4 | 329.7 |
| DTUL @ 1.8 Mpa (° C.) | 212.4 | 215.7 |
| Ten. Brk stress (MPa) | 117.63 | 81.8 |
| Ten. Modulus (MPa) | 9,249 | 8,842 |
| Ten. Brk strain (%) | 2.5 | 1.5 |
| Flex Brk stress (MPa) | 114 | 105 |
| Flex modulus (MPa) | 8,518 | 9,344 |
| Flex Brk strain (%) | 2.6 | 1.9 |
| Charpy Notched (KJ/m$^2$) | 6.1 | 1.7 |

EXAMPLE 2

Samples 8-9 are formed from various percentages of a liquid crystalline polymer, wollastonite (Nyglos® 4W), lubricant (Glycolube™ P), mica, hydrated alumina ("ATH"), 4,4'-biphenol ("BP"), and 2,6-naphthanlenedicarboxylic acid ("NDA"), as indicated in Table 3 below. The liquid crystalline polymer in each of the samples is formed from 4-hydroxybenzoic acid ("HBA"), 2,6-hydroxynaphthoic acid ("HNA"), terephthalic acid ("TA"), and hydroquinone ("HQ"), such as described in U.S. Pat. No. 5,969,083 to Long, et al. NDA is employed in the polymer in an amount of 20 mol. %. Comparative samples (Comp. Samples 2 and 3) are also formed without wollastonite. Compounding is performed using an 18-mm single screw extruder. Parts are injection molded the samples into plaques (60 mm×60 mm).

TABLE 3

|  | Comp. Sample 2 | Comp. Sample 3 | Sample 8 | Sample 9 |
|---|---|---|---|---|
| LCP (wt. %) | 67.57 | 67.57 | 67.57 | 67.57 |
| Glass Powder (wt.) | 10.00 | 10.00 | — | — |
| Nyglos ® 4W | — | — | 10.00 | 10.00 |
| Mica (wt. %) | 22.00 | 22.00 | 22.00 | 22.00 |
| Lubricant (wt. %) | 0.10 | 0.10 | 0.10 | 0.10 |
| Hydrated alumina | 0.20 | 0.20 | 0.20 | 0.20 |
| 4,4'-biphenol | 0.10 | 0.10 | 0.10 | 0.10 |
| 2,6-naphthalenedicarboxy acid | 0.03 | 0.03 | 0.03 | 0.03 |

Some of the molded parts are also tested for thermal and mechanical properties. The results are set forth below in Table 4.

TABLE 4

|  | Comp. Sample 2 | Comp. Sample 3 | Sample 6 | Sample 7 |
|---|---|---|---|---|
| Melt Viscosity at 1000 s$^{-1}$ and 350° C. (Pa-s) | 10 | 26 | 15 | 30 |
| Melt Viscosity at 400 s$^{-1}$ and 350° C. (Pa-s) | 13 | 34 | 22 | 41 |
| Tm (° C.) | 340 | 316 | 339 | 318 |
| DTUL @ 1.8 Mpa (° C.) | 277 | 274 | 276 | 276 |
| Charpy Notched (KJ/m$^2$) | 3.7 | 6.7 | 3.4 | 7.7 |
| Ten. Brk stress (MPa) | 118.4 | 136.5 | 114.0 | 138.1 |
| Ten. Modulus (MPa) | 14,280 | 12,455 | 15,013 | 12,832 |
| Ten. Brk strain (%) | 1.4 | 2.97 | 1.1 | 2.46 |
| Flex Brk stress (MPa) | 159.52 | 175.52 | 158.31 | 180.69 |
| Flex modulus (MPa) | 14,786 | 12,935 | 15,546 | 13,489 |
| Flex Brk strain (%) | 2.3 | 3.19 | 2.0 | 3.0 |
| Weldline Strength (lbf) | 6.6 | 8.2 | 6.0 | 8.0 |

EXAMPLE 3

Sample 10 is formed from a liquid crystalline polymer, wollastonite (Nyglos® 4W), lubricant (Glycolube™ P), talc, hydrated alumina ("ATH"), 4,4'-biphenol ("BP"), 2,6-naphthanlenedicarboxylic acid ("NDA"), and a black color masterbatch, as indicated in Table 5 below. The liquid crystalline polymer in each of the samples is formed from 4-hydroxybenzoic acid ("HBA"), 2,6-hydroxynaphthoic acid ("HNA"), terephthalic acid, and 4,4'-biphenol ("BP"). HNA is employed in the polymer in an amount of 20 mol. %. Compounding is performed using an 18-mm single screw extruder. Parts are injection molded the samples into plaques (60 mm×60 mm).

TABLE 5

|  | Sample 8 |
|---|---|
| LCP (wt. %) | 58.58 |
| Nyglos ® 4W | 18.00 |
| Talc (wt. %) | 18.00 |
| Lubricant (wt. %) | 0.10 |
| Hydrated alumina | 0.20 |
| 4,4'-biphenol | 0.10 |
| 2,6-naphthalenedicarboxy acid | 0.03 |
| Black Color Masterbatch | 5.00 |

Molded parts are also tested for thermal and mechanical properties. The results are set forth below in Table 6.

TABLE 6

|  | Sample 8 |
|---|---|
| Melt Viscosity at 1000 s$^{-1}$ and 350° C. (Pa-s) | 20.0 |
| Melt Viscosity at 400 s$^{-1}$ and 350° C. (Pa-s) | 34.3 |
| Tm (° C.) | 343.79 |
| DTUL @ 1.8 Mpa (° C.) | 274 |
| Charpy Notched (KJ/m$^2$) | 2 |
| Ten. Brk stress (MPa) | 11 |
| Ten. Modulus (MPa) | 97 |
| Ten. Brk strain (%) | 8,254 |
| Flex Brk stress (MPa) | 2.02 |
| Flex modulus (MPa) | 127 |
| Flex Brk strain (%) | 9,005 |
| Weldline Strength (lbf) | 2.35 |

EXAMPLE 4

Samples 11-12 are formed from various percentages of a liquid crystalline polymer, wollastonite (Nyglos® 8), talc, and black pigment (HCN-LC DU 005) as indicated in Table 7 below. The liquid crystalline polymer in each of the samples is formed from 4-hydroxybenzoic acid ("HBA"), terephthalic acid ("TA"), 4,4'-Biphenol ("BP"), 2,6-naphthalene dicarboxylic acid ("NDA") and hydroquinone ("HQ"), such as described in U.S. Pat. No. 5,969,083 to Long, et al. NDA is employed in the polymer in an amount of 20 mol. %. Compounding is performed using an 18-mm single screw extruder, with the wollastonite fibers being added at Barrel No. 6. Parts are injection molded the samples into plaques (60 mm×60 mm).

TABLE 7

|  | Sample 11 | Sample 12 |
|---|---|---|
| LCP (wt. %) | 55.00 | 55.00 |
| Nyglos ® 8 | 40.00 | 30.00 |
| Talc (wt. %) | — | 10.00 |
| Black Pigment (wt. %) | 5.00 | 5.00 |

Some of the molded parts are also tested for thermal and mechanical properties. The results are set forth below in Table 8.

TABLE 8

|  | Sample 11 | Sample 12 |
|---|---|---|
| Melt Viscosity at 1000 s$^{-1}$ and 350° C. (Pa-s) | 46.6 | 37.2 |
| Melt Viscosity at 400 s$^{-1}$ and 350° C. (Pa-s) | 74.4 | 58.5 |
| Tm (° C.) | 330.6 | 331.6 |
| DTUL @ 1.8 Mpa (° C.) | 271 | — |
| Charpy Notched (KJ/m$^2$) | 2.9 | 3.1 |
| Ten. Brk stress (MPa) | 85 | 114 |
| Ten. Modulus (MPa) | 15,042 | 14,389 |
| Ten. Brk strain (%) | 0.8 | 1.4 |
| Flex Brk stress (MPa) | 130 | 141 |
| Flex modulus (MPa) | 15,903 | 15,343 |
| Flex Brk strain (%) | 1.3 | 1.7 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A compact camera module that comprises a molded part, wherein the molded part of the compact camera module has a thickness of about 500 micrometers or less and is molded from a polymer composition that comprises a thermotropic liquid crystalline polymer that constitutes from about 40 wt. % to about 80 wt. % of the polymer composition; and a plurality of fibers consisting of mineral fibers, wherein the mineral fibers have a median width of from about 1 to about 35 micrometers, and constitute from about 5 wt. % to about 40 wt. % of the polymer composition, and wherein the mineral fibers have an aspect ratio of from about 2 to about 20.

2. The compact camera module of claim 1, wherein the thickness is from about 100 to about 450 micrometers.

3. The compact camera module of claim 1, wherein the liquid crystalline polymer contains aromatic ester repeating units.

4. The compact camera module of claim 3, wherein the aromatic ester repeating units are aromatic dicarboxylic acid repeating units, aromatic hydroxycarboxylic acid repeating units, or a combination thereof.

5. The compact camera module of claim 3, wherein the polymer further contains aromatic diol repeating units.

6. The compact camera module of claim 1, wherein the liquid crystalline polymer contains repeating units derived from 4-hydroxybenzoic acid, terephthalic acid, hydroquinone, 4,4'-biphenol, acetaminophen, 6-hydroxy-2-naphthoic acid, 2,6-naphthelene dicarboxylic acid, or a combination thereof.

7. The compact camera module of claim 1, wherein at least about 60% by volume of the mineral fibers have a diameter of from about 1 to about 35 micrometers.

8. The compact camera module of claim 1, wherein the mineral fibers have a median width of from about 3 to about 15 micrometers.

9. The compact camera module of claim 1, wherein the mineral fibers include a sulfate.

10. The compact camera module of claim 1, further comprising a conductive filler, glass filler, clay mineral, or a combination thereof.

11. The compact camera module of claim 1, further comprising a functional compound.

12. The compact camera module of claim 11, wherein the functional compound includes an aromatic compound that is an aromatic diol, aromatic carboxylic acid, or a combination thereof.

13. The compact camera module of claim 11, wherein the functional compound includes a non-aromatic compound that is a hydrate.

14. The compact camera module of claim 1, wherein the composition has a melt viscosity of from about 0.1 to about 80 Pa-s, as determined in accordance with ISO Test No. 11443 at a shear rate of 1000 seconds$^{-1}$ and temperature that is 15° C. above the melting temperature of the composition.

15. The compact camera module of claim 1, wherein the molded part has a surface glossiness of about 35% or more at an incident light angle of 85°.

16. The compact camera module of claim 1, wherein the mineral fibers comprise mineral fibers derived from a silicate.

17. The compact camera module of claim 16, wherein the silicate is an inosilicate.

18. The compact camera module of claim 17, wherein the inosilicate includes wollastonite.

\* \* \* \* \*